Aug. 28, 1956 — T. FERWERDA — 2,760,484
ANTI-BLACKOUT DEVICE
Filed Aug. 26, 1944 — 5 Sheets-Sheet 2
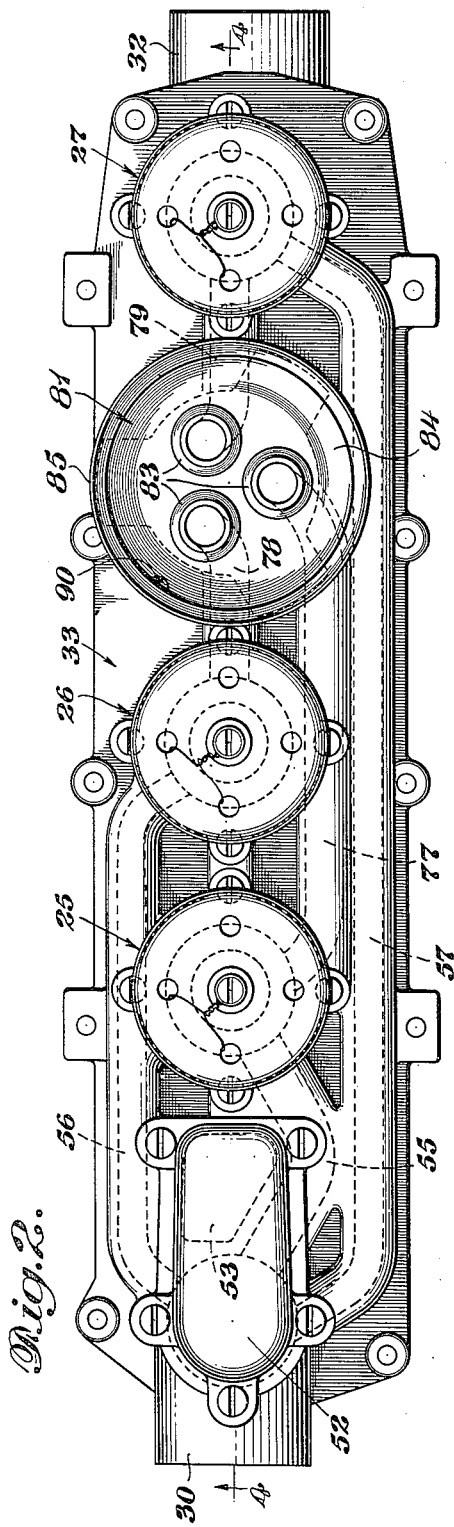
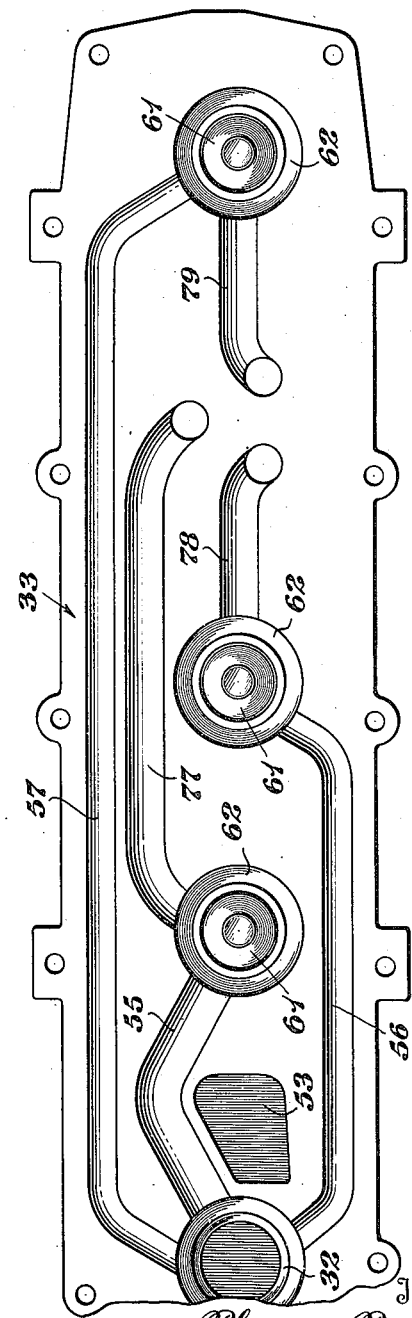
Inventor
Thomas Ferwerda,
By W. Glenn Jones
Attorney

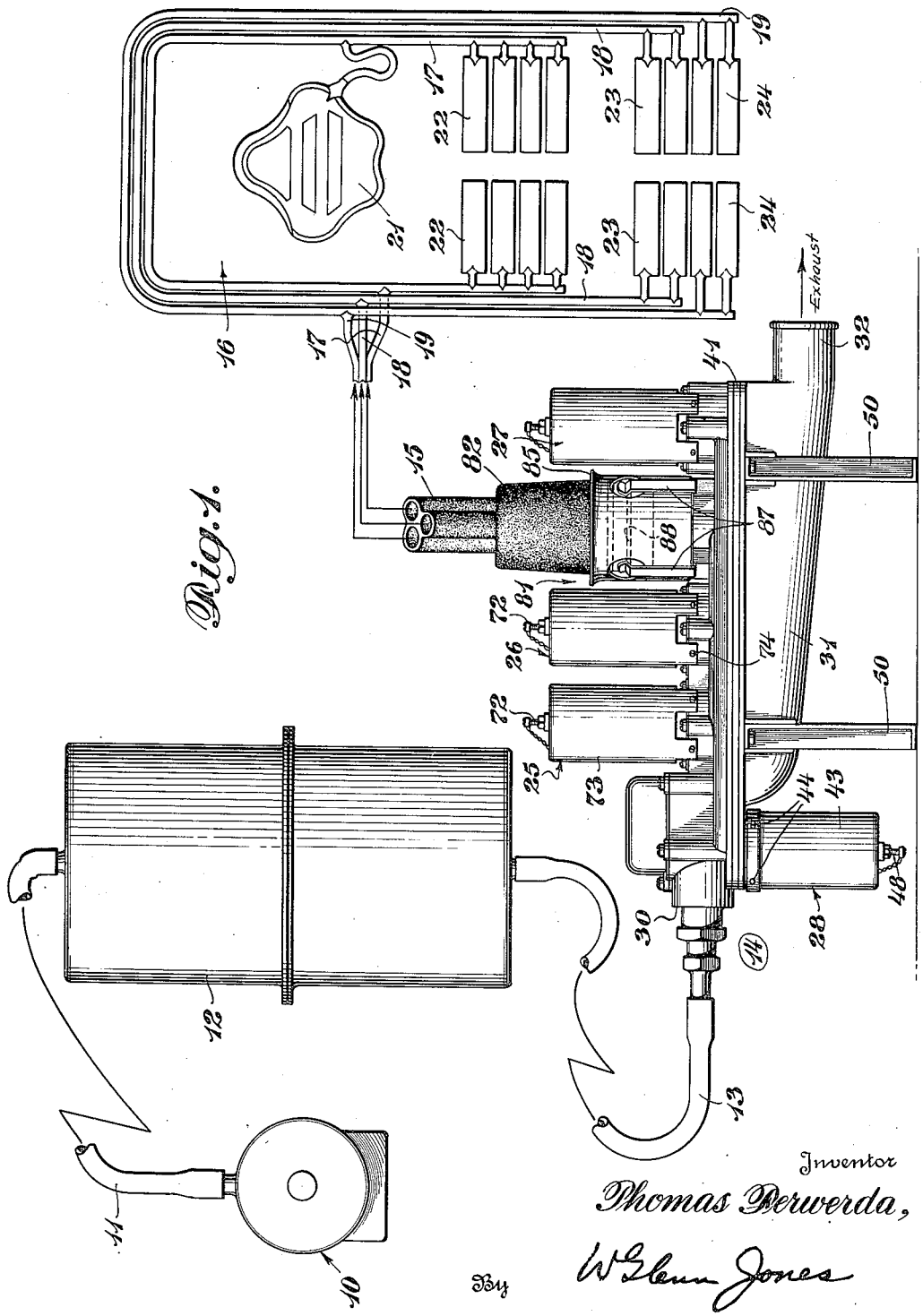

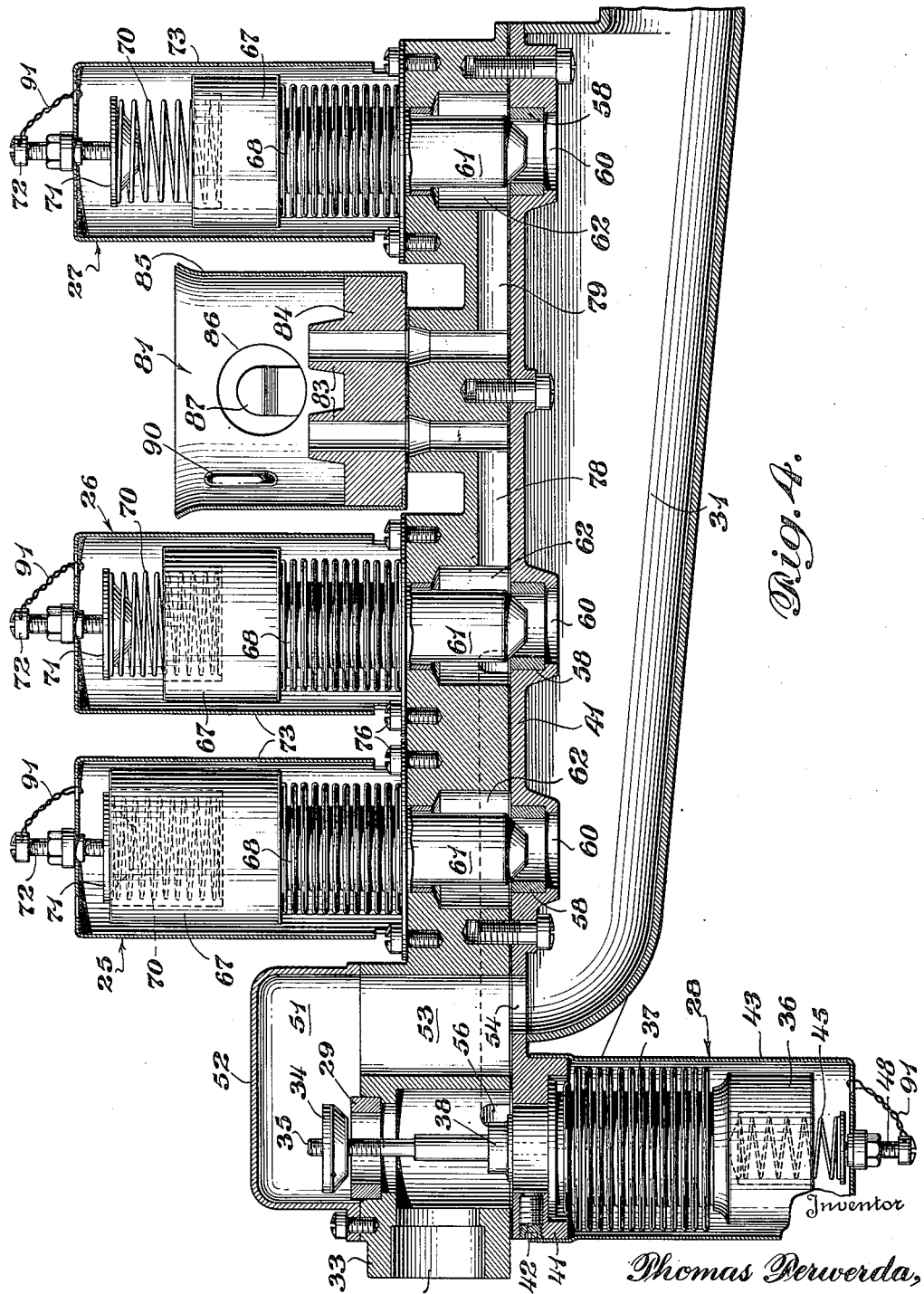

Inventor
Thomas Ferwerda,
By W Glenn Jones
Attorney

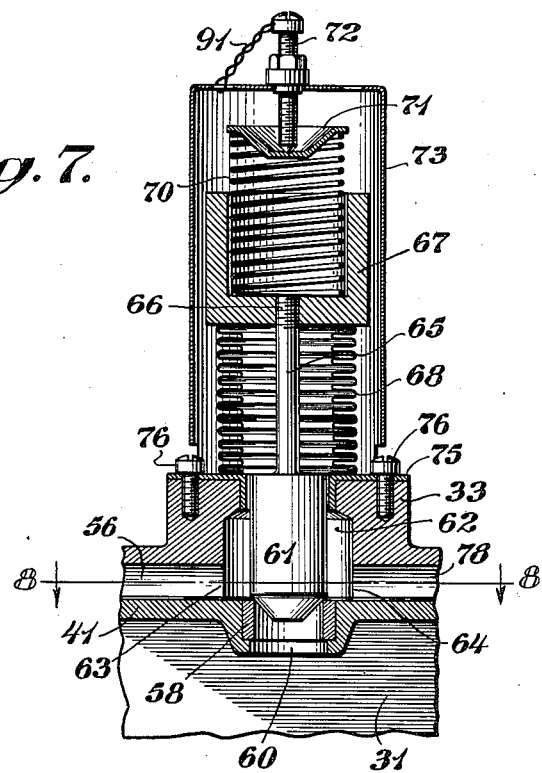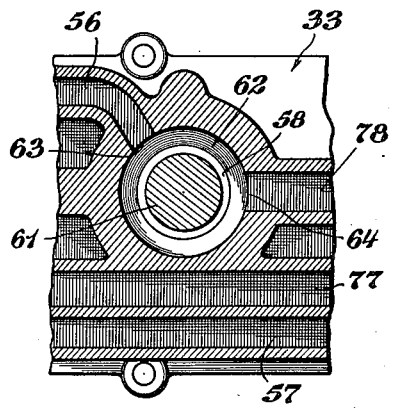

United States Patent Office 2,760,484
Patented Aug. 28, 1956

2,760,484

ANTI-BLACKOUT DEVICE

Thomas Ferwerda, United States Navy

Application August 26, 1944, Serial No. 551,414

12 Claims. (Cl. 128—1)

(Granted under Title 35, U. S. Code (1952), sec. 266)

This invention relates to an anti-blackout device and has for an object to provide an anti-blackout device suitable for use by aviators in combat aircraft or other aircraft where it is necessary to perform aerial acrobatics from time to time.

Aircraft have now become capable of such great speeds that, during aerial acrobatics such as in dive bombing and in making sudden turns in any direction, acceleration places the body of the aviator under such force that he either "grays" or blacks out, that is, the blood is forced from his eyes and brain to such an extent that he apparently sees a gray mist before him or he becomes unconscious. This state of affairs continues until the plane has reached an even keel again permitting the blood to flow back to its normal position and restore him to full consciousness. During this gray or blackout period, however, he is no longer in a position to either control his plane or to defend himself in combat. With the device of this invention, however, it becomes possible for the aviator to retain full consciousness during greater accelerations on turns than it is possible without this device.

During aerial acrobatics, the apparent weight of the aviator multiplies in ratio to the acceleration force to which he is subjected. When the weight is doubled, the aviator is said to be under two g, if tripled, it is said to be three g, etc. Present day airplanes are capable of withstanding many more g than the aviator can. With the device of this invention, the aviator will be able to withstand several more g wthout graying or blacking out than he can without this device. Obviously this will be a decided advantage to the aviator, especially in combat or dive bombing.

A further object of this invention is to provide an anti-blackout device which includes gradient pressure means for subjecting the body of the aviator to an increased pressure counteracting the increased g resulting from acceleration force during aerial acrobatics, the gradient pressure means being such that greater pressure is supplied as acceleration force becomes greater, and this is done automatically with no thought or action of the aviator necessary to initiate the action other than seeing that the device is in proper operative condition when he commences his flight.

A still further object of this invention is to provide an anti-blackout device which includes a pressure suit worn by the aviator, a gradient pressure controlling device fixedly mounted on the aircraft, and a quick detachable connection therebetween permitting the aviator to detach his suit from the equipment fixed to the aircraft instantaneously should it become necessary for him to bail out if his plane becomes disabled.

A still further object of this invention is to provide an anti-blackout device including a gradient pressure valve assembly unit which may be so adjusted as to provide a plurality of different pressures to different parts of the body or may be adjusted to supply the same instantaneous pressure to the various parts of the body of the aviator as desired.

A still further object of this invention is to provide an acceleration responsive valve to which is connected a source of air pressure on the airplane which will serve under a desired minimum acceleration such as 1½ to 2 g to direct the air from the source of pressure into the valve assembly unit of the anti-blackout device.

A still further object of this invention is to provide in the gradient pressure assembly unit an acceleration compensating valve which will control the pressure of the fluid coming from the acceleration responsive valve to the aviator's suit, the pressure varying according to the amount of acceleration or number of g to which the aviator is being subjected and which valve is adjusted so that the desired pressure may be attained.

With the foregoing and other objects in view, the invention consists in the construction, combination and arrangement of parts hereinafter described and illustrated in the drawing in which:

Fig. 1 is a partly elevational and partly schematic view of the anti-blackout device of this invention.

Fig. 2 is a top plan view of the gradient valve assembly unit of this invention.

Fig. 3 is a bottom plan view of the gradient valve assembly unit with the exhaust plate removed.

Fig. 4 is a sectional longitudinal view of the valve assembly unit, being substantially on line 4—4 of Fig. 2.

Fig. 7 is a sectional view of one of the acceleration compensating valves, and

Fig. 8 is a sectional view on line 8—8 of Fig. 7.

Figure 5:
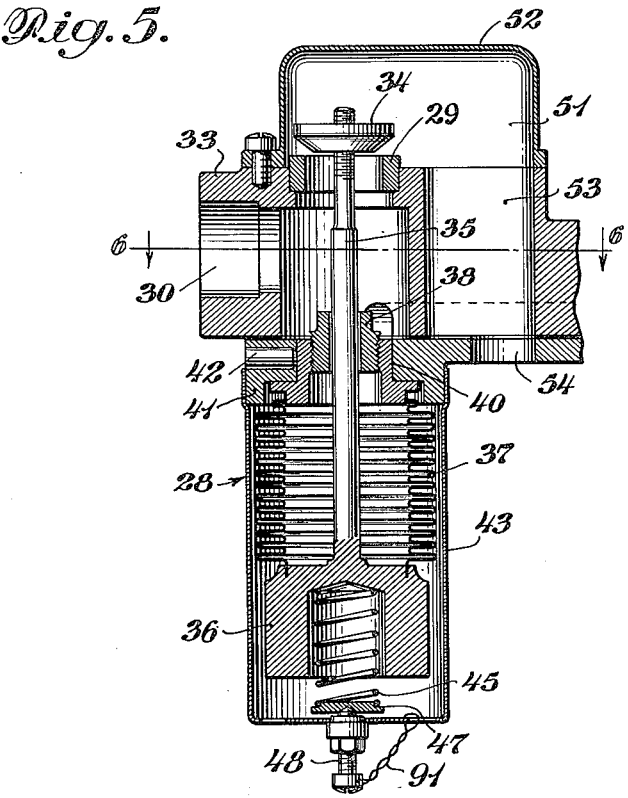
Fig. 5 is a sectional view of the acceleration responsive valve.
Figure 6:
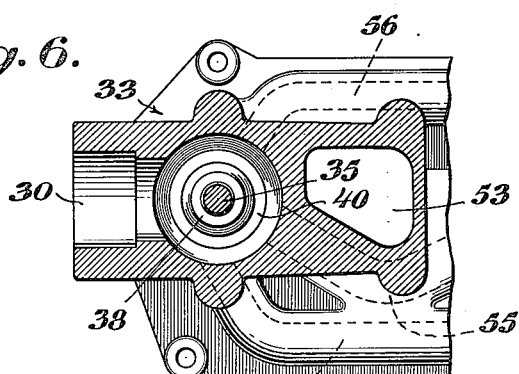
Fig. 6 is a sectional view on line 6—6 of Fig. 5.

The anti-blackout device of this invention is shown schematically in Fig. 1 wherein there is shown at 10 a source of adequate pressure producing means such as a pump connected by a pipe 11 through an oil vapor filter 12 for removing all traces of oil from the air under pressure coming from the pump 10. This filter 12 is connected by a pipe 13 to the valve assembly unit 14 here shown as a gradient pressure valve assembly unit for accepting the air under pressure from the pump 10 and delivering it through a multiple conduit 15 to an aviator's pressurizable suit or wearing apparel, schematically shown at 16. The gradient pressure valve assembly unit 14 as here shown is intended to deliver air under different pressures through each unit of the multiple conduit 15, each unit of the conduit 15 being connected as at 17, 18 and 19 to bladders 21, 22, 23 and 24 located in different parts of the suit 16 so as to apply different pressures to various parts of the body of the aviator.

Each unit of the multiple conduit 15 connects through a different one of the control valves 25, 26 and 27 of the valve assembly unit and the air under pressure passing through the multiple conduit 15 to the individual conduits 17, 18 and 19 is controlled and adjusted by adjusting the valves 25, 26 and 27. If it is desired to change the pressures applied to the various parts of the body, the control valves 25, 26 and 27 can be adjusted accordingly. Obviously they can be adjusted when desired to supply identical pressure to all parts of the body of the aviator. If it should be desired to permanently eliminate the differential in pressure between various parts of the body, then only one of the control valves need be used and the other ones could be omitted and the one that is retained would then supply identical pressure through the multiple conduit 15 to the various parts of the body of the aviator.

In normal flight zero gauge pressure is maintained in the suit 16 but during aerial acrobatics a pressure is maintained in the suit 16 by means of this device that is proportional to the amount of g caused by the acrobatics, and this pressure is supplied and built up automatically and without any action whatsoever on the part of the aviator. This is done by having the air supply means comprising the pump 10 continuously building up the maximum pressure that could ever be desired, which pressure reaches the valve unit 14 through the air under pipe 13. The pressure from the pipe 13 passes through the acceleration responsive valve 28 shown in detail in Figs. 4 and 5. This valve 28 is a Sylphon actuated valve which during level flight maintains an open connection from the pipe 13 connected to the air inlet 30 to an exhaust manifold 31 which discharges the air under pressure through an exhaust outlet 32 to the atmosphere.

This acceleration responsive valve 28 includes a valve insert seat 29 mounted in the body casting 33. A valve 34 threaded on the valve stem 35 is closed against the seat 29 by means of a weighted stem head 36 in cooperation with a spring bellows or Sylphon 37 which is exposed through the open bushing 38 about the valve stem 35 to the air under pressure passing through the body casting 33. The bushing 38 is threaded into a fitting 40 which is held in position in an appropriate opening in a plate 41 between the body casting 33 and the exhaust 31 by means of a set screw 42. A cylindrical cap 43 is secured by nuts through the same plate 41. A compression spring 45 is placed in a counter-sink in the weighted valve stem head 36 and on a plate 47 whose position is adjustably controlled by the stud bolt 48 threaded through the end of the cap 43.

By judicious selection of an appropriate weight in the stem head 36, proper strength in the Sylphon 37 and adjusting the spring 45 by means of the stud bolt 48 and appropriately positioning the valve 34 with relation to its seat 29, the valve 34 can be made to close as desired. It will be noted that this valve stem head 36 and the other control parts just described are all suspended below the valve 34 and the valve assembly unit 14 is mounted in the airplane by means of its supporting feet 50. When aerial acrobatics on the part of the airplane causes centrifugal force to create an increased amount of g equal to 1½ to 2 g on the weighted valve stem head 36, the various control parts just described are operated so that the valve 34 will close tightly against its valve seat 29 and cut off the flow of pressure from the inlet 30 through the passage 51 provided by a valve cover 52 and an opening 53 in the body casting 33 and an opening 54 in the plate 41 to the exhaust manifold 31. When the pressure is thus cut off from the exhaust manifold it is diverted to three different size passageways 55, 56 and 57 in the body casting 33, each of the passageways leading to a different one of the control or acceleration compensating valves 25, 26 and 27.

Inasmuch as each of these control valves 25, 26 and 27 is substantially identical in construction and in operation except that they are differently adjusted when it is desired that they shall permit differential pressures to pass therethrough, the following description as applied to the detail shown in Fig. 7 applies to each of the controls 25, 26 and 27 except as hereinafter pointed out. Furthermore, the control valve shown in Fig. 7 is generally similar in construction and operation to that shown in Fig. 5 except the control parts of this valve are above instead of below the valve. The plate 41 is provided with a valve insert seat 58 connecting to an opening 60 leading to the exhaust manifold 31. The opening through the valve seat 58 may be closed off more or less or completely by the valve 61 extending through the valve chamber 62, there being a pressure inlet 63 and a pressure outlet 64 connected to the chamber 62.

The valve 61 depends from a valve stem 65 threaded as at 66 to a weighted valve head 67. It is principally by the variation of weight and size of this valve head 67 that the control valves 25, 26 and 27 differ from each other as will be apparent from Fig. 4. The valve head 67 rests on a spring bellows or Sylphon 68 which is connected around the valve 61 to the chamber 62 thus exposing the Sylphon 68 to the pressure in chamber 62. A coil spring 70 countersunk into the valve head 67 is held against a conical base plate 71 whose position may be adjusted by an adjustable stud bolt 72 extending through a cylindrical cover 73 secured at 74 to the body casting 33. The Sylphon 68 is likewise secured by a plate 75 and stud screws 76 to the body casting 33.

Under the action of acceleration force the coil spring 70, weighted valve head 67, and Sylphon 68 all coact so as to more or less close the valve 61 against the valve insert seat 58, thus cutting off the escape of various amounts of pressure to the exhaust manifold 31 and diverting it to the outlet 64, these various control parts being so selected as to divert the desired amount of air to the outlet 64. As the amount of g increases, the valve 61 approaches the closed position to a greater degree thus diverting a greater amount of air from the chamber 62 to the chamber outlet 64 as it proportionally cuts off the escape of pressure from the chamber 62 through opening 60 to the exhaust manifold 31. The outlets 64 of each of the control valves 25, 26 and 27 are connected by passageways 77, 78 and 79 to the coupling unit 81, and by means of the multiple conduit 15 and individual conduits 17, 18 and 19 through the suit 16.

This coupling unit 81 is a quick detachable coupling unit which includes a plug 82 through which the multiple conduit 15 is connected to individual flexible female or socket openings adapted to be pressed and held against the male openings 83 in a plate 84 mounted on the body casting 33 within an opened flared cup 85. Each of the male plugs 83 is connected to one or the other of the passageways 77, 78 or 79. The flared cup 85 is provided with a plurality of openings 86 in its side through which extend spring fingers 87 adapted to cooperate with recessed neck 88 formed in the plug 82 so as to detachably hold the plug 82 in position. A feather 90 is pressed in through the side of the flared cup 85 and cooperates with a keyway formed in the plug 82 so as to insure the correct connection between passageways 77, 78 and 79. Once the stud bolts 48 and 72 have been properly adjusted, they may be locked against accidental displacement from the adjusted position by means of a safety wire 91 connecting the heads of the stud bolts to the valve cups.

In operation, the aviator having donned the suit 16, connects it up to the valve assembly unit 14 on the airplane by merely placing the plug 82 of the quick detachable coupling unit 81 into the flared cup 85 and aligns the keyway in the plug 82 to the feather 90 so as to connect it to the proper passageways. Thereafter the operation is entirely without thought or action on the part of the aviator. The pump 10 operating in the usual manner on the airplane supplies air under pressure through the pipe 11, filter 12, and pipe 13 to the inlet 30 of the body casting 33. In level flight, valve 34 remains open and the air under pressure is spilled out through the exhaust manifold 31.

Whenever the aviator indulges in aerial acrobatics to a degree sufficient to cause from 1½ to 2 g, valve 34 closes against its insert seat 29 and the air under pressure is then diverted through the passageways 55, 56 and 57 to the control or acceleration compensating valves 25, 26 and 27. These valves approach the closed position in proportion to the amount of g thereon diverting a proportional amount of air under pressure to the passageways 77, 78 and 79 while spilling the excess air through the openings 60 to the exhaust manifold 31. The air under pressure in passageways 77, 78 and 79 passes through the coupling unit 81 and multiple conduit 15 to the pressure bladders 21, 22, 23 and 24 in the various parts of the suit 16 thus applying a compensating pressure to the aviator's body that is proportional to the increased amount of g to which he is subjected. This pressure exerted on the various parts of the body of the aviator counteracts the tendency to gray or blackout and keeps him fully conscious in spite of the increased g to which he is subjected.

It has been found that many aviators are able to tolerate 3 to 4 or more g with the aid of this device and remain more fully conscious and in fuller control of all their senses than they can without the aid of this anti-blackout device. Should the aviator find it necessary to bail out and abandon his plane for any reason, and take to his parachute, he can do so without concerning himself as to this device either by manually pulling the plug 81 out of the flare cup 85 or by letting the weight of his body do so as he abandons the plane.

Other modifications and changes in the number and arrangement of the parts may be made by those skilled in the art without departing from the nature of the invention, within the scope of what is hereinafter claimed.

The invention described herein may be manufactured or used by or for the Government of the United States of America for governmental purposes without the payment of any royalties thereon or therefor.

What is claimed is:

1. An anti-blackout device for aviators including an aviator's pressurizable wearing apparel, a source of fluid under pressure, inertia means automatically operable upon an increase of g for maintaining a portion of said fluid under pressure in said wearing apparel, proportional to the increase of g, and quick detachable means connecting said pressurizable wearing apparel to said fluid pressure maintaining means, said quick detachable means including a plug attached to said pressure maintaining means, a socket engageable with said plug, and yieldable means for holding said plug and socket in coengagement.

2. An anti-blackout device for aviators including an aviator's pressurizable wearing apparel, a source of fluid under pressure, valve means automatically operable upon an increase of g for establishing and maintaining a portion of said fluid pressure from said source in said wearing apparel, proportional to the increase of g, and quick detachable means connecting said pressurizable wearing apparel to said valve means, said quick detachable means including a plug attached to said valve means, a socket engageable with said plug, yieldable means for holding said plug and socket in coengagement, and a tube connecting said socket to said wearing apparel.

3. An anti-blackout device for aviators including an aviator's pressurizable wearing apparel, a source of fluid under pressure, valve means automatically operable under an increase of g for controlling and maintaining a portion of said fluid under pressure proportional to the increase of g to obtain effective flow of fluid to and into said wearing apparel, means connecting said pressurizable wearing apparel to said valve means, said pressurizable wearing apparel including a plurality of pressurizable units, said valve means including a plurality of differently loaded valves normally connecting the fluid under pressure from said source to an exhaust, and operable under an increase of g to divert differing portions of said fluid from said source proportional to the increase of g to different pressurizable units of said wearing apparel.

4. An anti-blackout device for aviators including an aviator's pressurizeable wearing apparel, a source of fluid under pressure, valve means automatically operable under an increase of g for controlling and maintaining a portion of said fluid under pressure proportional to the increase of g to obtain effective flow of fluid to and into said wearing apparel, means connecting said pressurizeable wearing apparel to said valve means, said pressurizeable wearing apparel including a plurality of pressurizeable units, said valve means including a plurality of differently loaded valves normally connecting the fluid under pressure from said source to an exhaust, and operable under an increase of g to divert differing portions of said fluid from said source proportional to the increase of g to different pressurizeable units of said wearing apparel, said loaded valves being individually adjustable.

5. An anti-blackout device for aviators including an aviator's pressurizeable wearing apparel, a source of fluid under pressure, and valve means automatically operable under an increase of g for controlling and maintaining a portion of said fluid under pressure proportional to the increase of g to obtain effective flow of fluid to and into said wearing apparel said valve means including a loaded valve normally discharging the fluid under pressure from said source and operable under a desired minimum increase of g to direct the fluid under pressure toward said pressurizeable wearing apparel, said valve means also including a second loaded valve operable upon receiving fluid under pressure from said first loaded valve under an increase of g to direct a portion of said fluid under pressure proportional to the increase of g to said pressurizeable wearing apparel.

6. An anti-blackout device for aviators including an aviator's pressurizeable wearing apparel, a constant source of fluid under pressure, and gradient valve means automatically operable under an increase of g for controlling and maintaining a portion of said fluid under constant pressure proportional to the increase of g to obtain effective flow of fluid to and into said wearing apparel, said gradient valve means including a first loaded valve normally discharging the fluid under pressure from said source, and operable under a desired minimum increase of g to direct the fluid under pressure toward said pressurizeable wearing apparel, said pressurizeable wearing apparel including a plurality of pressurizeable units, said gradient valve means also including a plurality of different valves operable upon receiving fluid under pressure from said first loaded valve under an increase of g to direct differing portions of said fluid under pressure, proportional to the increase of g to different pressurizeable units of said wearing apparel.

7. In a fluid pressure control valve assembly, a valve means automatically operable by acceleration force, said valve means including a valve chamber, an unrestricted pressure inlet to said chamber, an unrestricted outlet from said chamber, an exhaust pressure outlet from said chamber, a valve seat in said exhaust outlet, a valve adapted to close against said valve seat, a loaded valve head, a valve stem connecting said valve head to said valve, a spring bellows about said valve stem between said valve chamber and said weighted valve head, the interior of said bellows being connected to said valve chamber, and an adjustable compression spring based at one end of said valve head.

8. In a fluid pressure control valve assembly, a valve means automatically operable by acceleration force, said valve means including a valve chamber, an unrestricted pressure inlet to said chamber, an unrestricted outlet from said chamber, an exhaust pressure outlet from said chamber, a valve seat in said exhaust outlet, a valve adapted to close against said valve seat, a loaded valve head, a valve stem connecting said valve head to said valve, a spring bellows about said valve stem between said valve chamber and said weighted valve head, the interior of said bellows being connected to said valve chamber, and an adjustable compression spring having one end based against said loaded valve head.

9. In a fluid pressure control valve assembly, a valve means automatically operable by acceleration force, said valve means including a valve chamber, an unrestricted pressure inlet to said chamber, an unrestricted outlet from said chamber, an exhaust pressure outlet from said chamber, a valve seat in said exhaust outlet, a valve adapted to close against said valve seat, a weighted valve head, a valve stem connecting said valve head to said valve, a spring bellows about said valve stem between said valve chamber and said valve head, the interior of said bellows being connected to said valve chamber, a compression spring having one end based against said valve head, and an adjustably positioned base against the other end of said compression spring.

10. In a fluid pressure control valve assembly, a valve means automatically operable by acceleration force, said valve means including a valve chamber, an unrestricted pressure inlet to said chamber, an unrestricted outlet from said chamber, an exhaust pressure outlet from said chamber, a valve seat in said exhaust outlet, a valve adapted to close against said valve seat, a weighted valve head, a valve stem connecting said weighted valve head to said valve, a spring bellows about said valve stem between said valve chamber and said weighted valve head, the interior of said bellows being connected to said valve chamber, a compression spring having one end based against said weighted valve head, and an adjustably positioned base against the other end of said compression spring, said valve being above said valve seat, said weighted valve head being below said valve seat, whereby pressure in said spring bellows aids centrifugal force in closing said valve against said exhaust outlet valve seat to thereby divert all the pressure to said unrestricted outlet.

11. In a fluid pressure control valve assembly, a valve means automatically operable by acceleration force, said valve means including a valve chamber, an unrestricted pressure inlet to said chamber, an unrestricted outlet from said chamber, an exhaust pressure outlet from said chamber, a valve seat in said exhaust outlet, a valve adapted to close against said valve seat, a weighted valve head, a valve stem connecting said weighted valve head to said valve, a spring bellows about said valve stem between said valve chamber and said weighted valve head, the interior of said bellows being connected to said valve chamber, a compression spring having one end based against said weighted valve head, and an adjustably positioned base against the other end of said compression spring, said valve being above said valve seat, said weighted valve head also being above said valve seat, whereby pressure in said spring bellows resists the closing moment of said weighted valve head under centrifugal force in an amount inversely proportional to the moment of acceleration force thereon to thereby keep said exhaust outlet valve partially open in an amount proportional to the acceleration force thereon and divert a proportional amount of pressure from said exhaust outlet to said unrestricted outlet.

12. In a fluid pressure control mechanism, means providing a chamber, means to deliver to said chamber a fluid under pressure, means to convey such fluid to a point of delivery, a vent port for said chamber, a valve controlling said port, a collapsible bellows exposed to the pressure obtaining within the chamber for opening said valve, a spring opposing the action of the bellows, and a weight opposing the action of said bellows whereby the pressure necessary to move said valve varies with the force of acceleration to which the weight is subjected.

References Cited in the file of this patent

UNITED STATES PATENTS

| | | |
|---|---|---|
| 235,186 | Watts | Dec. 7, 1880 |
| 455,913 | Walker | July 14, 1891 |
| 1,268,597 | Montreuil | June 4, 1918 |
| 1,737,588 | Hopkins | Dec. 3, 1929 |
| 2,104,758 | Poppen | Jan. 11, 1938 |
| 2,222,886 | Voigt | Nov. 26, 1940 |
| 2,228,115 | Holste | Jan. 7, 1941 |
| 2,335,474 | Beall | Nov. 30, 1943 |
| 2,620,791 | Versoy et al. | Dec. 9, 1952 |
| 2,676,586 | Coakwell | Apr. 27, 1954 |

FOREIGN PATENTS

| | | |
|---|---|---|
| 316,557 | Italy | Apr. 10, 1934 |